United States Patent
Yamashita et al.

(10) Patent No.: US 9,235,426 B2
(45) Date of Patent: Jan. 12, 2016

(54) MULTICORE PROCESSOR SYSTEM, COMPUTER PRODUCT, AND NOTIFICATION METHOD FOR UPDATING OPERATING SYSTEM

(75) Inventors: Koichiro Yamashita, Hachioji (JP); Hiromasa Yamauchi, Kawasaki (JP); Kiyoshi Miyazaki, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 295 days.

(21) Appl. No.: 13/613,605

(22) Filed: Sep. 13, 2012

(65) Prior Publication Data

US 2013/0007439 A1 Jan. 3, 2013

Related U.S. Application Data

(63) Continuation of application No. PCT/JP2010/054606, filed on Mar. 17, 2010.

(51) Int. Cl.
G06F 9/00 (2006.01)
G06F 9/44 (2006.01)

(52) U.S. Cl.
CPC ............ G06F 9/4405 (2013.01); G06F 9/441 (2013.01)

(58) Field of Classification Search
CPC ............ G06F 9/00; G06F 9/441; G06F 8/65; G06F 8/665; G06F 8/67
USPC ...................... 713/2, 100; 717/168
See application file for complete search history.

(56) References Cited

U.S. PATENT DOCUMENTS

| 5,473,775 A | 12/1995 | Sakai et al. |
| 5,825,649 A | 10/1998 | Yoshimura |
| 6,789,158 B2 * | 9/2004 | Takahashi ............... 711/103 |
| 7,305,668 B2 * | 12/2007 | Kennedy et al. ............ 717/168 |
| 7,797,693 B1 * | 9/2010 | Gustafson et al. .......... 717/168 |
| 2002/0178352 A1 * | 11/2002 | Lambino et al. ............... 713/2 |
| 2003/0177223 A1 * | 9/2003 | Erickson et al. ............ 709/224 |
| 2004/0083355 A1 * | 4/2004 | Smith et al. ................... 713/1 |
| 2007/0169098 A1 | 7/2007 | Kikuchi |

FOREIGN PATENT DOCUMENTS

| JP | 53-38237 | 4/1978 |
| JP | 54-106146 | 8/1979 |
| JP | 07-311749 | 11/1995 |
| JP | 10-83309 | 3/1998 |
| JP | 10-260845 | 9/1998 |
| JP | 2000-29679 | 1/2000 |
| JP | 2003-330744 | 11/2003 |
| JP | 2004-206453 | 7/2004 |
| JP | 2007-193596 | 8/2007 |
| JP | 2007-219696 | 8/2007 |

OTHER PUBLICATIONS

International Search Report for PCT/JP2010/054606, mailed on Apr. 13, 2010.
International Preliminary Report on Patentability issued Sep. 27, 2012 in corresponding International Patent Application No. PCT/JP2010/054606.
Japanese Office Action mailed May 21, 2013 in corresponding Japanese Application No. 2012-505383.
Japanese Office Action mailed Aug. 26, 2014 in corresponding Japanese Patent Application No. 2013-235497.

* cited by examiner

*Primary Examiner* — Chun Cao
(74) *Attorney, Agent, or Firm* — Staas & Halsey LLP

(57) ABSTRACT

A multicore processor system includes a processor configured to detect, among cores that have booted with an old boot program in the multicore processor, a core to which no process is assigned; change upon detecting a core to which no process is assigned, a reference area from a storage area for the old boot program to a storage area for a new boot program; and notify the core to which no process is assigned of a reboot instruction specifying the reference area after the change.

6 Claims, 17 Drawing Sheets

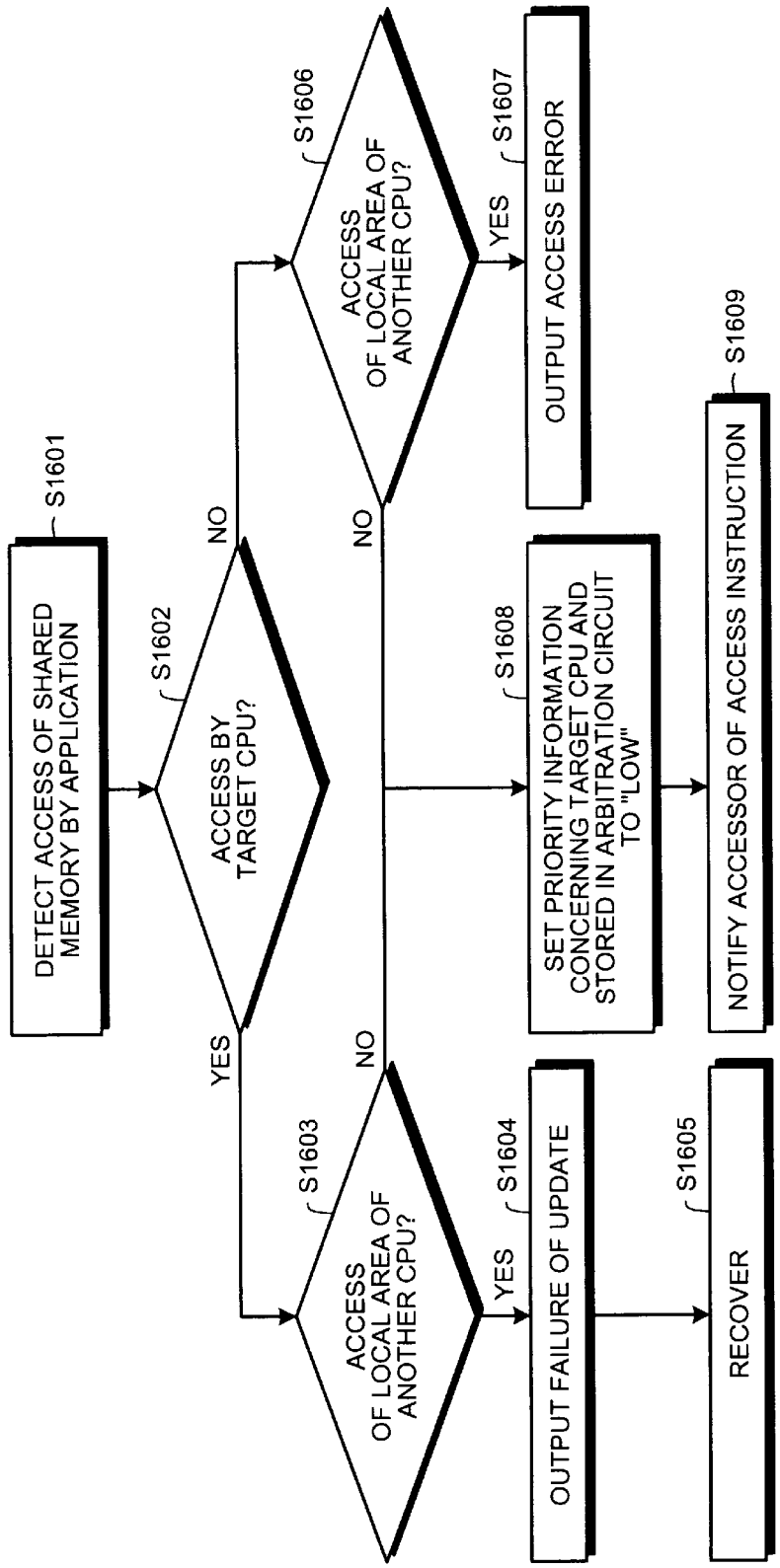

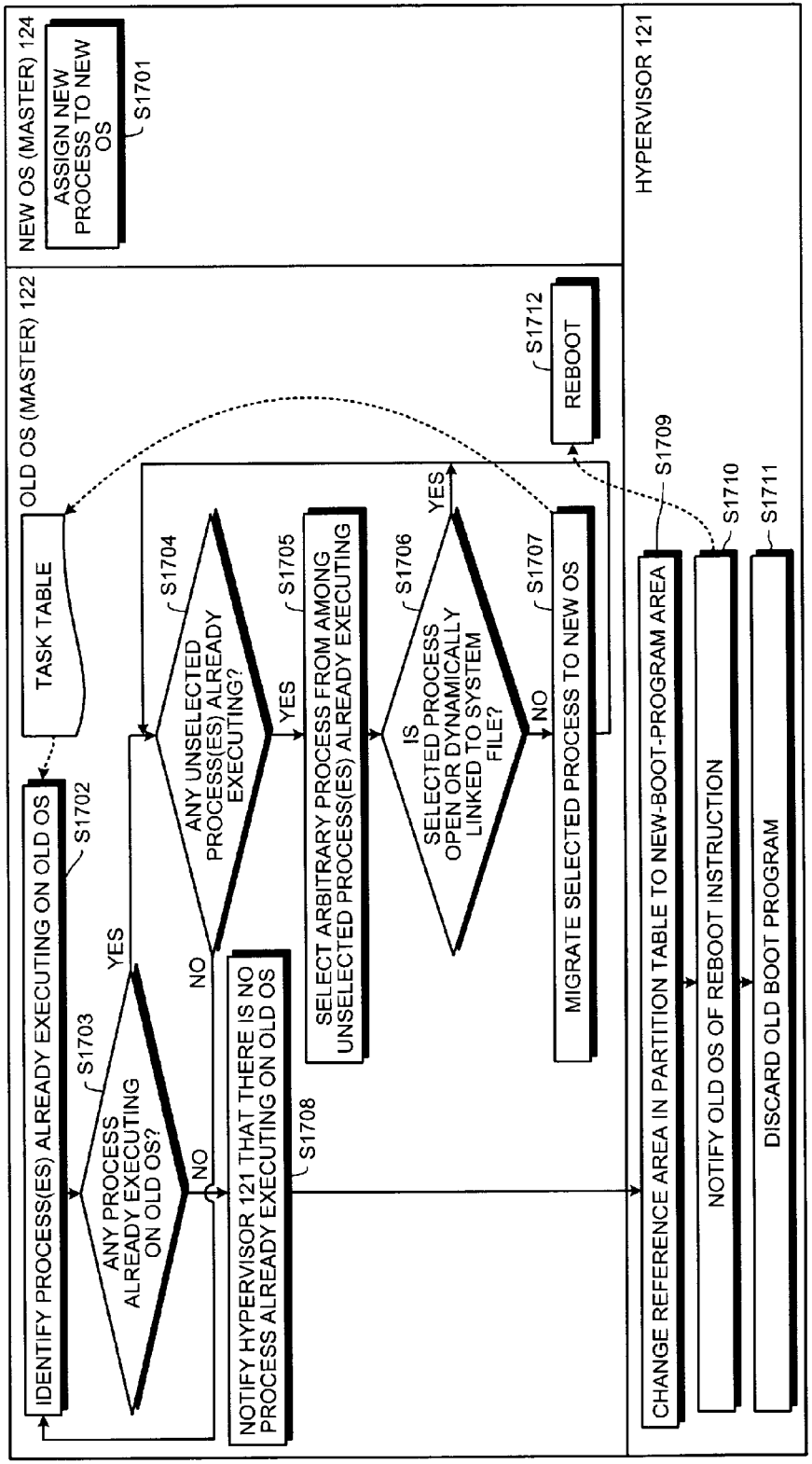

MULTICORE PROCESSOR SYSTEM, COMPUTER PRODUCT, AND NOTIFICATION METHOD FOR UPDATING OPERATING SYSTEM

CROSS REFERENCE TO RELATED APPLICATIONS

This application is a continuation application of International Application PCT/JP2010/054606, filed on Mar. 17, 2010 and designating the U.S., the entire contents of which are incorporated herein by reference.

FIELD

The embodiments discussed herein are related to a multicore processor system, a notification program, and a notification method for updating an operating system.

BACKGROUND

Conventional mobile terminals have to suspend the execution of an application(s) during an update of an operating system (hereinafter, "OS"). As a result, a user cannot utilize the operation (hereinafter, "function") of the application(s) during the update. Thus, the OS is updated at hours such as midnight during which the frequency of use by the user decreases. However, different from general-purpose computers, the embedded system of the mobile terminal is supposed to operate 24 hours a day, 365 days a year. Thus, the suspension of the execution has been a problem.

For servers, two methods for updating the OS without any suspension have been suggested. One of the methods (hereinafter, "conventional technology 1") has a stand-by system other than the main system and causes the stand-by system to operate during the update of the main system (see, for example, Japanese Laid-Open Patent Publication Nos. S54-106146 and 2003-330744). The other one of the methods controls a virtual machine to execute software including the OS during the update (hereinafter, "conventional technology 2").

However, the conventional technologies 1 and 2 have a problem of an increased scale and/or cost of the embedded system. On the other hand, without the substituting stand-by system or the virtual machine, the execution has to be suspended.

As described above, the embedded system of the mobile terminal is supposed to operate 24 hours a day, 365 days a year. However, there has been a problem in that the user cannot utilize the function during the update and the execution has to be suspended.

SUMMARY

According to an aspect of an embodiment, a multicore processor system includes a processor configured to detect, among cores that have booted with an old boot program in the multicore processor, a core to which no process is assigned; change upon detecting a core to which no process is assigned, a reference area from a storage area for the old boot program to a storage area for a new boot program; and notify the core to which no process is assigned of a reboot instruction specifying the reference area after the change.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 16 is a flowchart of the memory access restriction performed by the hypervisor 121; and FIG. 17 is a flowchart of the update of the OS performed by the multicore processor system 100 (part 3).

DESCRIPTION OF EMBODIMENTS

A preferred embodiment of a multicore processor system, a notification program, and a notification method according to the present invention is described in detail below with reference to the accompanying drawings.

Figure 1:
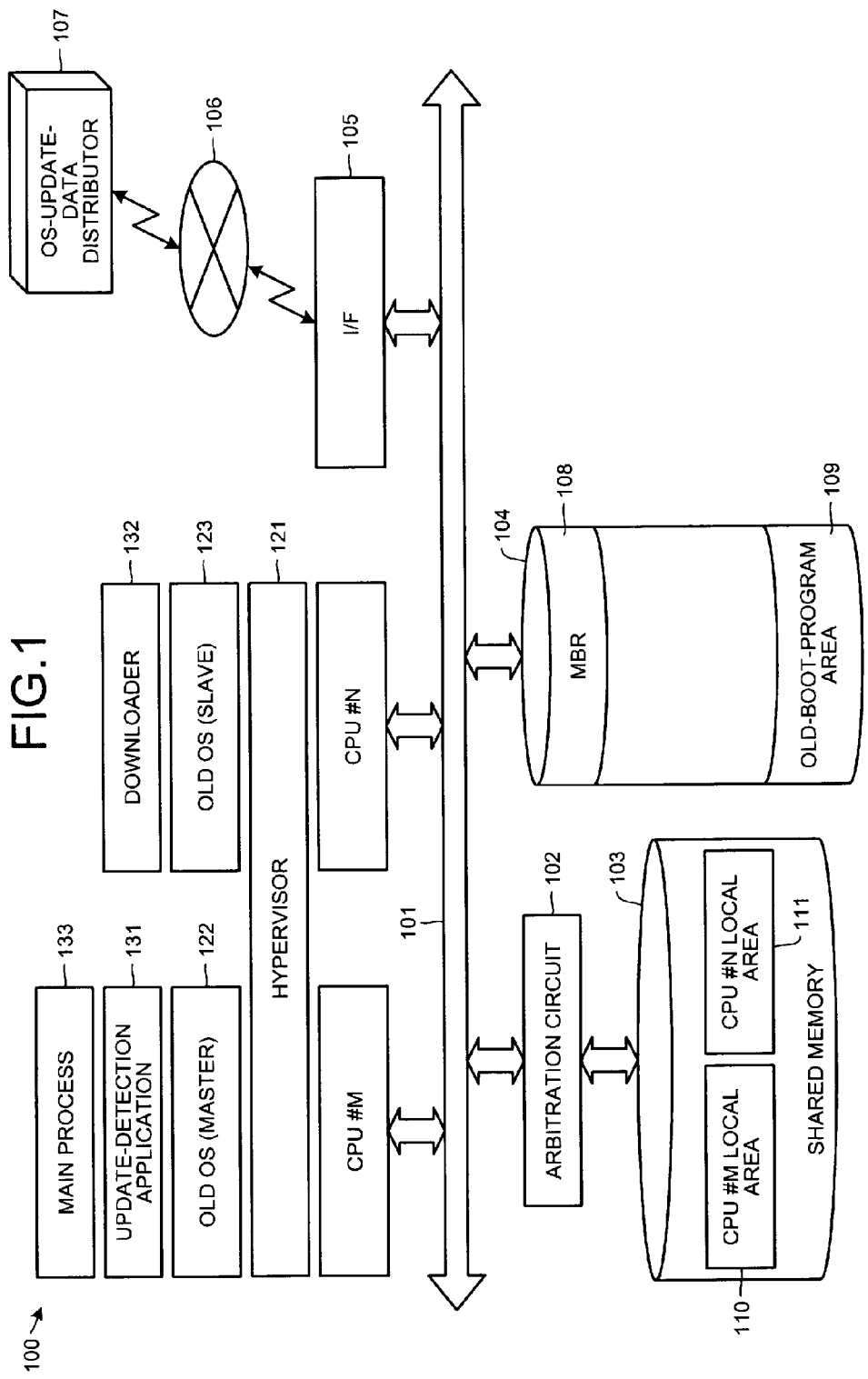
FIG. 1 is a hardware block diagram of a multicore processor system according to an embodiment.

FIG. 1 is a hardware block diagram of a multicore processor system according to an embodiment. As depicted in FIG. 1, a multicore processor system 100 includes a central processing unit (CPU) #M, a CPU #N, an arbitration circuit 102, shared memory 103, storage 104, and an interface (I/F) 105 that are connected to each other by a bus 101.

A multicore processor is a processor including multiple cores. The multicore processor may be a single processor including multiple cores or single-core processors connected in parallel, provided the multicore processor includes multiple cores. For simplicity, two single-core processors (a CPU #M and a CPU #N) connected in parallel are taken as an example in the present embodiment.

The CPU #M and the CPU #N include cores that can operate independently, caches, and registers. A program stored in the storage 104 is mapped to and loaded on the shared memory 103 by the CPU #M or the CPU #N, thereby causing the process coded therein to be executed by the CPU #M or the CPU #N.

The arbitration circuit 102 arbitrates simultaneous access of the shared memory 103 by different CPUs to prevent contention. The arbitration circuit 102 arbitrates access of the shared memory 103 based on priority information stored therein and indicating the priority of each CPU. In the present embodiment, the priority has two levels, namely "high" indicating the priority is high and "low" indicating the priority is not high.

The shared memory 103 includes a CPU #M local area 110 and a CPU #N local area 111 and is implemented by, for example, a read only memory (ROM) or a random access memory (RAM) that is used as a work area of the CPU #M and the CPU #N.

The storage 104 includes an MBR 108, a storage area for an old boot program (hereinafter, "old-boot-program area 109"), and a file system area for a user and is implemented by, for example, a flash ROM or a hard disk drive.

The master boot record (MBR) 108 is the top (sector) of the storage 104 read first at the start-up of the CPU #M or the CPU #N. The MBR 108 stores therein information on which OS stored in the storage 104 to start up and how to start up the OS, such as a bootstrap loader, a partition table, and a boot signature.

The bootstrap loader stores therein a program for start-up. The partition table stores therein the start address and the end address of an area where a boot program is stored. The boot signature stores therein the value 0xAA55 as an identifier, which indicates the MBR 108 is valid. The MBR 108 is invalid if 0xAA55 is not stored in the boot signature.

The boot program is a core program of an OS. For example, the core of Linux OS is the kernel. The old-boot-program area 109 stores therein an old boot program, and the start address and the end address of the area are stored in the partition table. The adjective old/new for the boot program according to the present embodiment indicates whether the boot program was stored in the storage 104 earlier, or the version of the boot program has been updated.

When the CPU #M or the CPU #N is started up, the MBR 108 is read first, and the process coded in the program for start-up stored in the bootstrap loader is executed by the CPU #M or the CPU #N. The bootstrap loader reads the partition table that stores the position and the size of each partition, and reads the start address of the old boot program of the OS.

The CPU #M reads the old boot program, and maps the old boot program to the shared memory 103. The area in the shared memory 103 to which the old boot program is mapped by the CPU #M is the CPU #M local area 110 described above. The CPU #M starts to execute the process coded in the old boot program as an old OS (master) 122.

On the other hand, the CPU #N reads the old boot program, and maps the old boot program to the shared memory 103. The area in the shared memory 103 to which the old boot program is mapped by the CPU #N is the CPU #N local area 111 described above. The CPU #N starts to execute the process coded in the old boot program as an old OS (slave) 123 of the master OS.

The I/F 105 administers an internal interface with a network 106, and controls the input/output of data from/to an external device(s). For example, a modem can be employed as the I/F 105. The I/F 105 is connected to the network 106 such as a local area network (LAN), a wide area network (WAN), and the Internet via a communication line, and connected to an OS-update-data distributor 107 via the network 106.

A hypervisor 121 is a program that is directly executed on hardware such as the CPU #M and the CPU #N, and stored in a register of the hardware. The hypervisor 121 operates independently for each CPU, but executes the same process. Thus, only one hypervisor 121 is depicted in FIG. 1.

For example, in the deletion of the old boot program described later, it seems as if multiple hypervisors 121 delete the old boot program of which only one exists; in actuality, the hypervisor 121 of the CPU that has reached the deletion process first deletes the old boot program. Thus, the old boot program to be discarded is not present any more when the hypervisors 121 of the other CPUs attempt to delete the old boot program later.

The hypervisor 121 can execute a privileged instruction to refer to a register(s) in the CPU #M or the CPU #N directly, or to read/write information stored in the register(s).

The privileged instruction of the hypervisor 121 includes a reboot instruction to the CPU #M or the CPU #N. For example, the reboot instruction issued by the hypervisor 121 is an instruction for the CPU #M or the CPU #N to jump to the start address of the old-boot-program area 109 described in the partition table. In the present embodiment, the CPU #M or the CPU #N is instructed to jump to the start address of a storage area for a new boot program (hereinafter, "new-boot-program area") to start up the OS by the new boot program.

The old OS (master) 122 and the old OS (slave) 123 are software executed on the hypervisor 121. The meaning of master/slave for the OS is different from that of master/slave for the connection of CPUs. The master OS (the old OS (master) 122 in the present embodiment) executes a scheduler for assignment of processes, and the slave OS (the old OS (slave) 123 in the present embodiment) executes the process(es) assigned by the scheduler.

The master OS registers the result of the assignment of processes into a task table that stores process information managed by common OSs, such as the time required for start-up, the memory resource, the process number, the name of the user who started up the process, the execution requirements (e.g., the version of the library provided by the OS linked to the process), and the path to the executable file. Thus, by reading the time required for start-up and/or the execution requirements from the task table by the old OS (master) 122, the CPU #M can monitor which application (process) is assigned to which OS and/or which application (process) has been completed.

An update-detection application 131 is an application program executed on the OS, and detects an update of the boot program. The update-detection application 131 is assigned to the old OS (master) 122. A main process 133 for graphic user interface (GUI) is also assigned to the old OS (master) 122.

A downloader 132 is an application program executed on the OS, and downloads the boot program and/or the library. Both the old OS (master) 122 and the old OS (slave) 123 can execute the downloader 132, but herein the downloader 132 is assigned to the old OS (slave) 123.

The downloader 132 downloads the new boot program from the OS-update-data distributor 107 via the I/F 105, and executes static verification for checking an error in the binary data of the boot program and/or compliance to standard. On the other hand, dynamic verification is a check whether the OS is normally booted by the new boot program.

Figure 2:
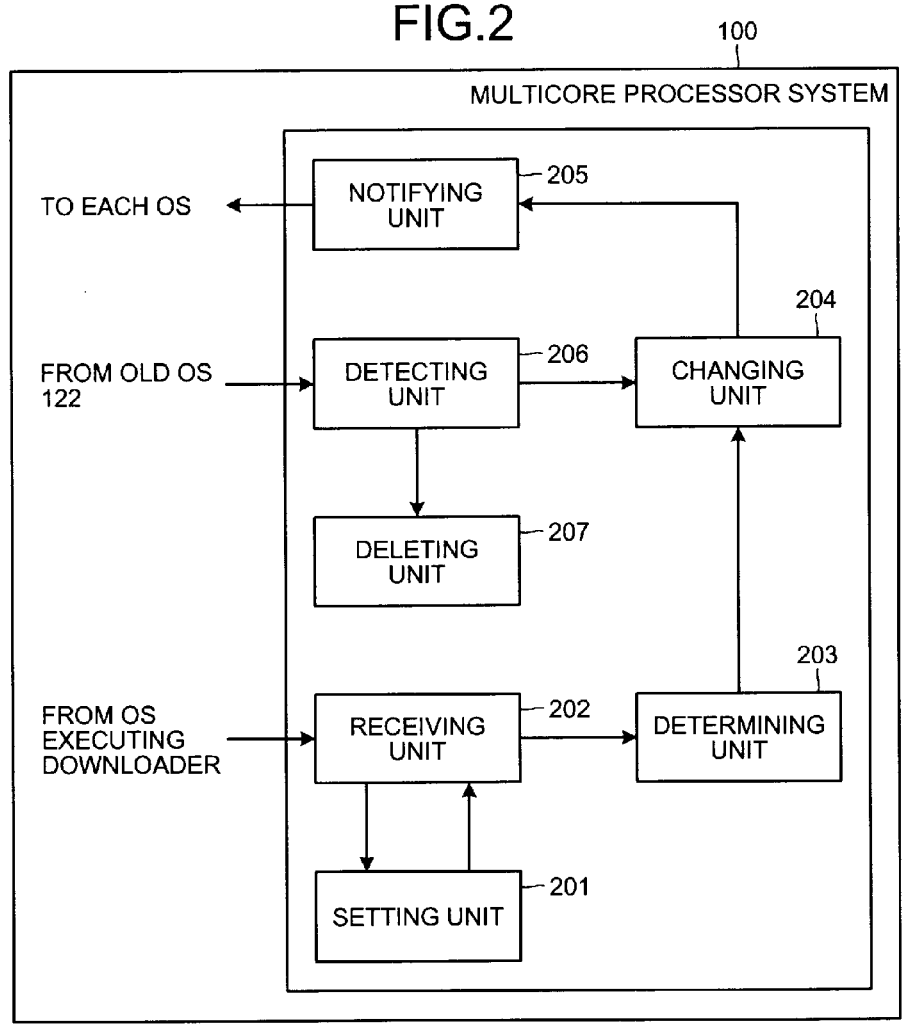
FIG. 2 is a functional block diagram of a multicore processor system 100.

FIG. 2 is a functional block diagram of the multicore processor system 100. The hypervisor 121 in the multicore processor system 100 includes a setting unit 201, a receiving unit 202, a determining unit 203, a changing unit 204, a notifying unit 205, a detecting unit 206, and a deleting unit 207. The functions (i.e., the setting unit 201 to the deleting unit 207) are implemented by the CPU #M and the CPU #N executing the hypervisor 121 stored in the storage 104 or the ROM of the shared memory 103, since the hypervisor 121 is a program that includes a notification program as described above.

The setting unit 201 sets the new-boot-program area based on the old-boot-program area 109 and a given mask value upon receiving an instruction to update the new boot program.

After the new-boot-program area is set by the setting unit 201, the receiving unit 202 receives an access of the old-boot-program area 109, related to the download of the new boot program.

The determining unit 203 determines whether the access received at the receiving unit 202 is a write access or a read access.

If the access is determined to be a write access by the determining unit 203, the changing unit 204 changes the address specified in the write access to an address specifying the new-boot-program area based on the given mask value.

If the access is a read access, the notifying unit 205 notifies the accessor of an instruction to access the address specified in the read access. If the access is a write access, the notifying unit 205 notifies the accessor of an instruction to access the address after the change by the changing unit 204. Processes subsequent to the download of the new boot program are described next.

The detecting unit 206 detects, among CPUs booted by the old boot program in the multicore processor, a CPU(s) to which no process is assigned. As described later, in the present embodiment, the OS detects a core(s) to which no process is assigned, and notifies the hypervisor 121 that no process is assigned to the detected core(s). The hypervisor 121 receives the notification, thereby detecting the core(s) to which no process is assigned.

If the detecting unit 206 detects a CPU(s) to which no process is assigned, the changing unit 204 changes a reference area from the old-boot-program area 109 to the storage area for the new boot program.

The notifying unit 205 notifies the detected CPU(s) of a reboot instruction specifying the reference area after the change by the changing unit 204.

If a CPU(s) to which no process is assigned is not detected, the detecting unit 206 detects a CPU(s) that has completed all processes assigned thereto.

If the detecting unit 206 detects a CPU(s) that has completed the processes, the changing unit 204 changes the reference area from the old-boot-program area 109 to the new-boot-program area. The notifying unit 205 notifies the detected CPU(s) of the reboot instruction specifying the reference area after the change by the changing unit 204.

Upon notification of the reboot instruction by the notifying unit 205, the changing unit 204 changes the address specifying the old-boot-program area 109 stored in the MBR of the storage to the address specifying the new-boot-program area, based on the given mask value.

The deleting unit 207 deletes the old boot program stored in the old-boot-program area 109 when the old-boot-program area 109 stored in the MBR of the storage is changed by the changing unit 204.

Taking the description above into account, details of the operation of the multicore processor system 100 are described with reference to the drawings.

Figure 3:
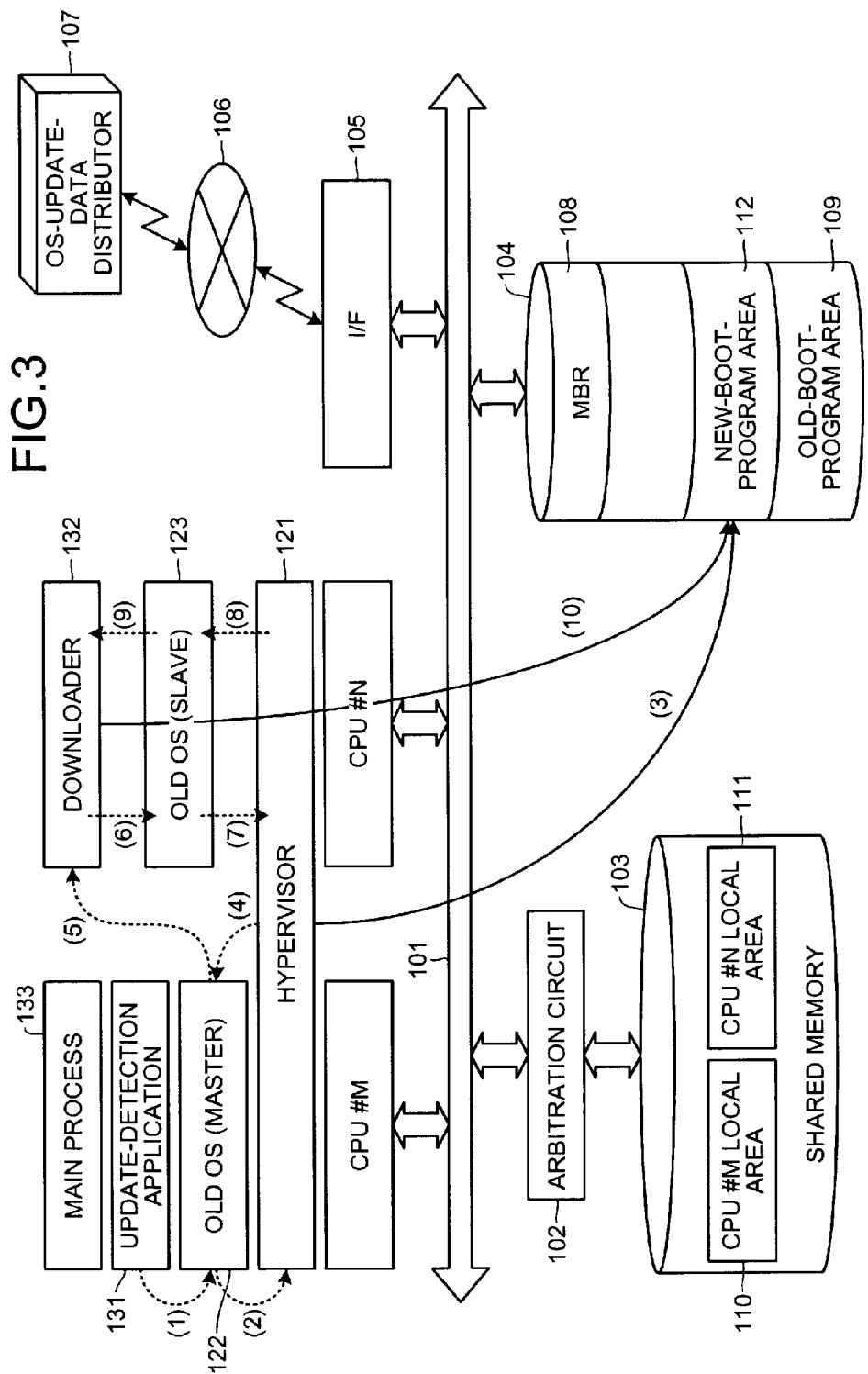
FIG. 3 is a diagram of an example of a download of a new boot program and the preparation thereof.

FIG. 3 is a diagram of an example of the download of the new boot program and the preparation thereof. The update-detection application 131 detects an update of the boot program via the I/F, and (1) notifies the old OS (master) 122 of the update of the boot program. Upon receiving the update of the boot program, the old OS (master) 122 (2) notifies the hypervisor 121 of the update of the boot program. Upon receiving the update of the new boot program, the hypervisor 121 (3) sets the new-boot-program area 112 based on the given mask value and the old-boot-program area.

Figure 4:
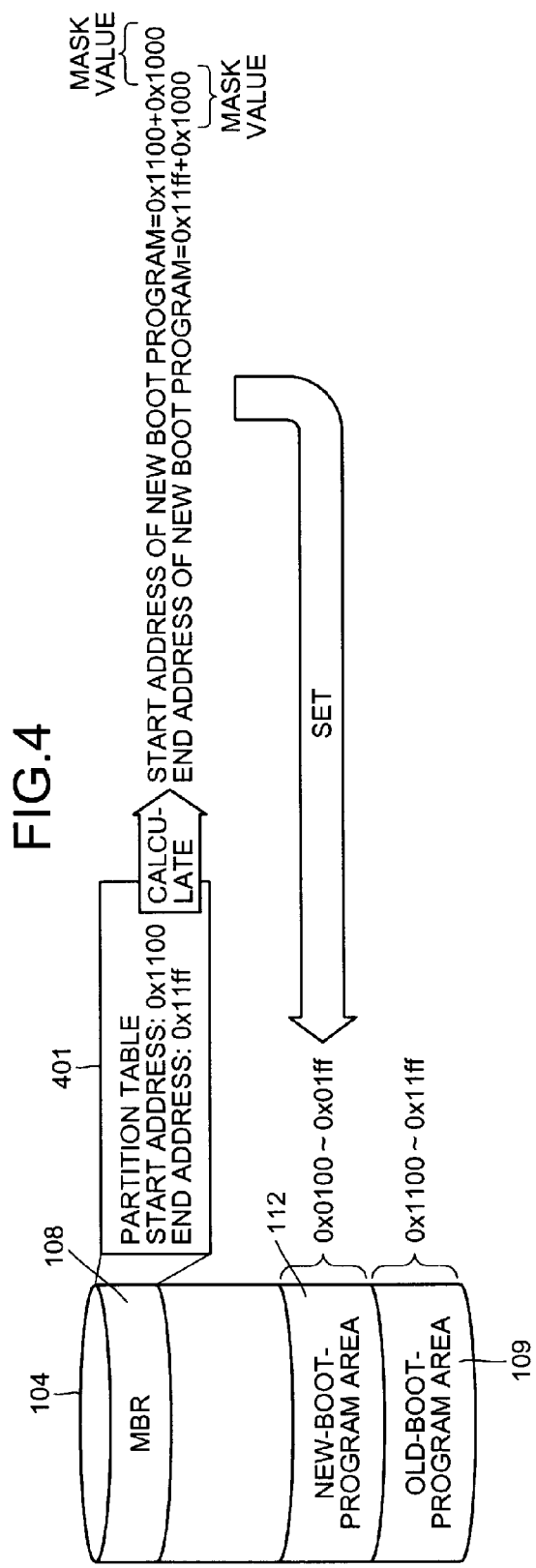
FIG. 4 is a diagram of an example of setting a new-boot-program area 112.

FIG. 4 is a diagram of an example of setting the new-boot-program area 112. Here, (3) an example of setting the area for the new boot program is described in detail. The hypervisor 121 refers to a partition table 401 of the MBR 108, and obtains the start address and the end address of the old-boot-program area 109. The hypervisor 121 calculates the start address of the new-boot-program area 112 by taking logical OR of the start address of the old-boot-program area 109 and the mask value.

The hypervisor 121 calculates the end address of the new-boot-program area 112 by taking logical OR of the end address of the old-boot-program area 109 and the mask value. The hypervisor 121 secures the area from the calculated start address to the calculated end address in the storage 104 as the area for the new boot program.

Here, reference of the description returns to FIG. 3; (4) the hypervisor 121 notifies the old OS (master) 122 of a download instruction and monitors access of the old boot program, related to the downloader 132 of the new boot program and the static verification. Upon receiving the download instruction, the old OS (master) 122 (5) notifies the downloader 132 of the download instruction. Upon receiving the download instruction, the downloader 132 downloads the new boot program from the OS-update-data distributor 107 via the I/F 105.

To enable a write access related to the old boot program during the download of the new boot program by the downloader 132, (6) access of the old boot program is received by the old OS (slave) 123. Upon receiving access of the old boot program, related to the download of the new boot program, (7) the old OS (slave) 123 inputs the access into the hypervisor 121.

Upon receiving access of the old boot program, related to the download of the new boot program, the hypervisor 121 determines whether the access is a write access or a read access. If the hypervisor 121 determines the access to be a write access, the hypervisor 121 changes the address indicated by the write access to the address specifying the new-boot-program area 112, based on the given mask value.

The hypervisor 121 (8) notifies the old OS (slave) 123 of an instruction to access the address after the change. On the other hand, if the hypervisor 121 determines the access to be a read access, the hypervisor 121 notifies the old OS (slave) 123 of an instruction to access the address specified in the read access.

It is assumed that the address specified in the access is 0x1110, and the given mask value is 0x1000. For example, if the access is a read access, the hypervisor 121 notifies the old OS (slave) 123 of an instruction to access 0x1110. For example, if the access is a write access, the hypervisor 121 changes the address to the address specifying the new-boot-program area 112 by calculating logical OR of 0x1110 and 0x1000 (equation (1) below), and notifies the old OS (slave) 123 of an instruction to access the address after the change.

The address specifying the boot-program area $$= 0 \times 1110 + 0 \times 1000 \qquad (1)$$
$$= 0 \times 0110$$

"+" represents logical OR. Thus, the hypervisor 121 notifies the old OS (slave) 123 of an instruction to access 0x0110.

Upon receiving the access instruction from the hypervisor 121, the old OS (slave) 123 (9) notifies the downloader 132 of the access instruction. Since FIG. 3 illustrates an example of a write access, the downloader 132 (10) accesses the address after the change.

Figure 5:
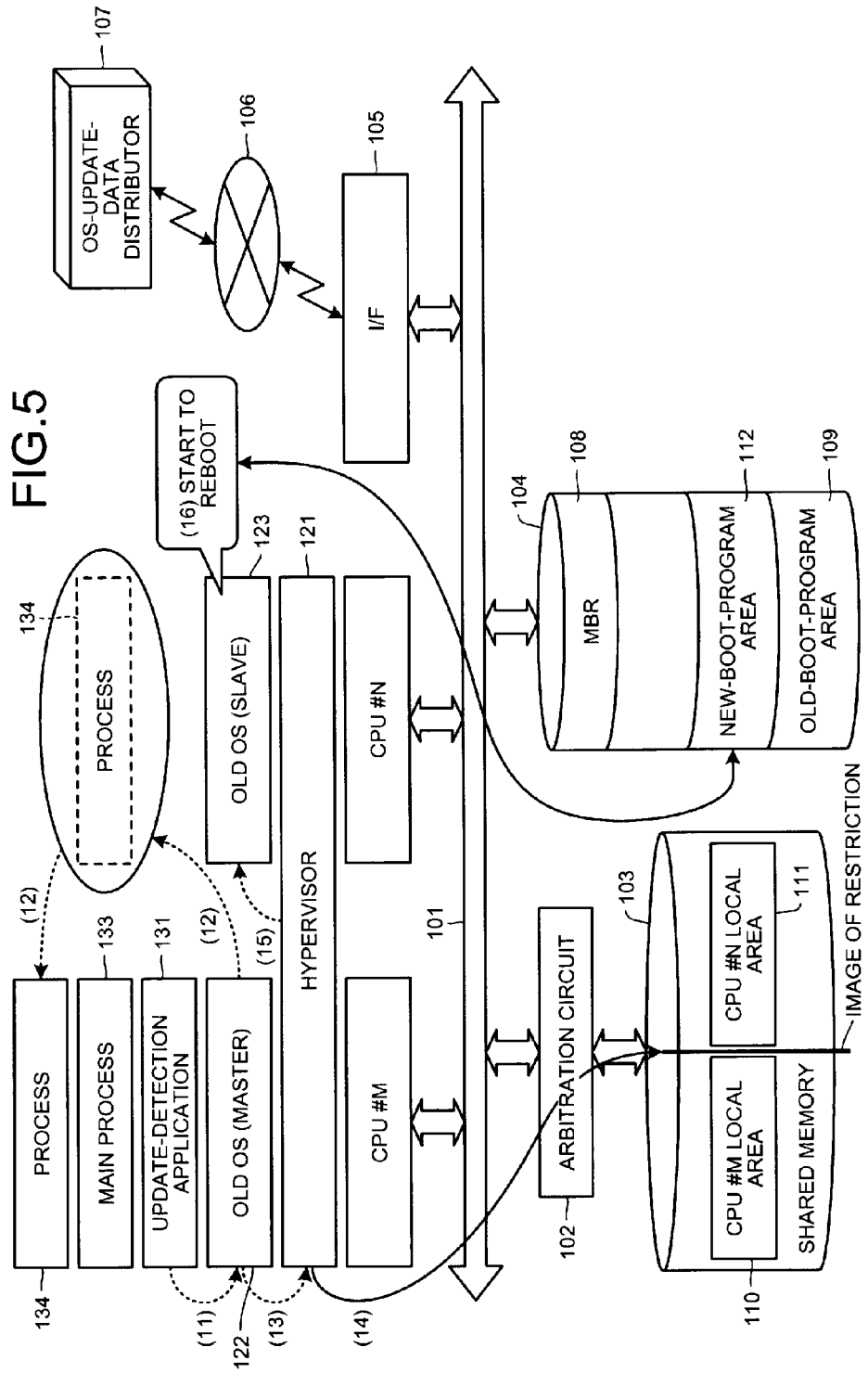
FIG. 5 is a diagram of an example of rebooting a CPU #N.

FIG. 5 is a diagram of an example of rebooting the CPU #N. After the download of the new boot program to the new-boot-program area 112, the update-detection application 131 (11) notifies the old OS (master) 122 of update requirements that includes execution constraints, the target version, the number of CPUs that perform update (hereinafter, "target CPUs"), and urgency information concerning whether the degree of urgency is high or low.

Upon receiving the update requirements, the old OS (master) 122 reads the urgency information from the received update requirements, and if the urgency information indicates a high degree of urgency, identifies a process(es) assigned to the target CPU(s) based on the task table and (12) forcibly migrates the process(es). Here, a process 134 is identified, and the process 134 assigned to the target CPU is assigned to the CPU #M by the forced migration.

Here, it is assumed the target CPU is the CPU #N. The target CPU(s) is a CPU(s) that reboots with the new boot program prior to the other CPUs. Determination of the target CPU(s) is not limited to a specific method, provided that the master OS that can assign a process(es) to the old OS is rebooted last among the old OS.

For example, if the multicore processor includes 4 CPUs, the target CPUs are two CPUs other than the CPU executing the master OS. The CPU executing the master OS and the other remaining CPU are CPUs that reboot after the reboot of the target CPUs. Alternatively, all CPUs other than the CPU executing the master OS may be the target CPUs.

If the urgency information indicates that the degree of urgency is not high (low degree of urgency), the old OS (master) 122 detects a CPU(s) to which no process is assigned, from among CPUs other than the CPU executing the master OS in the multicore processor. However, the CPU(s) to which no process is assigned is not detected since a process is assigned to the CPU #N. The old OS (master) 122 inhibits dispatch to the CPU #N, and detects the completion of the process assigned to the CPU #N.

When the process assigned to the CPU #N is no longer present due to the forced migration or the completion of the process, (13) the old OS (master) 122 notifies the hypervisor 121 of the completion of the process assigned to the CPU #N (or the target CPU) and an instruction of memory access restriction. Upon receiving the notification, the hypervisor 121 (14) starts access restriction concerning the shared memory 103. Thereafter, for example, each OS and application cannot access the shared memory 103 until receiving an access instruction from the hypervisor 121.

After the start of the access restriction concerning the shared memory 103, the hypervisor 121 changes the reference area of the boot program from the old-boot-program area 109 to the new-boot-program area 112, and (15) notifies the old OS (slave) 123 of a reboot instruction specifying the reference area after the change. Upon receiving the reboot instruction, the old OS (slave) 123 (16) starts the reboot by referring to the new boot program. One of the target CPUs reboots with the new OS as the master OS. Here, the CPU #N reboots with the new OS as the master OS since the CPU #N is the only target CPU. The memory access restriction performed by the hypervisor 121 is described next with reference to FIGS. 6 to 9.

Figure 6:
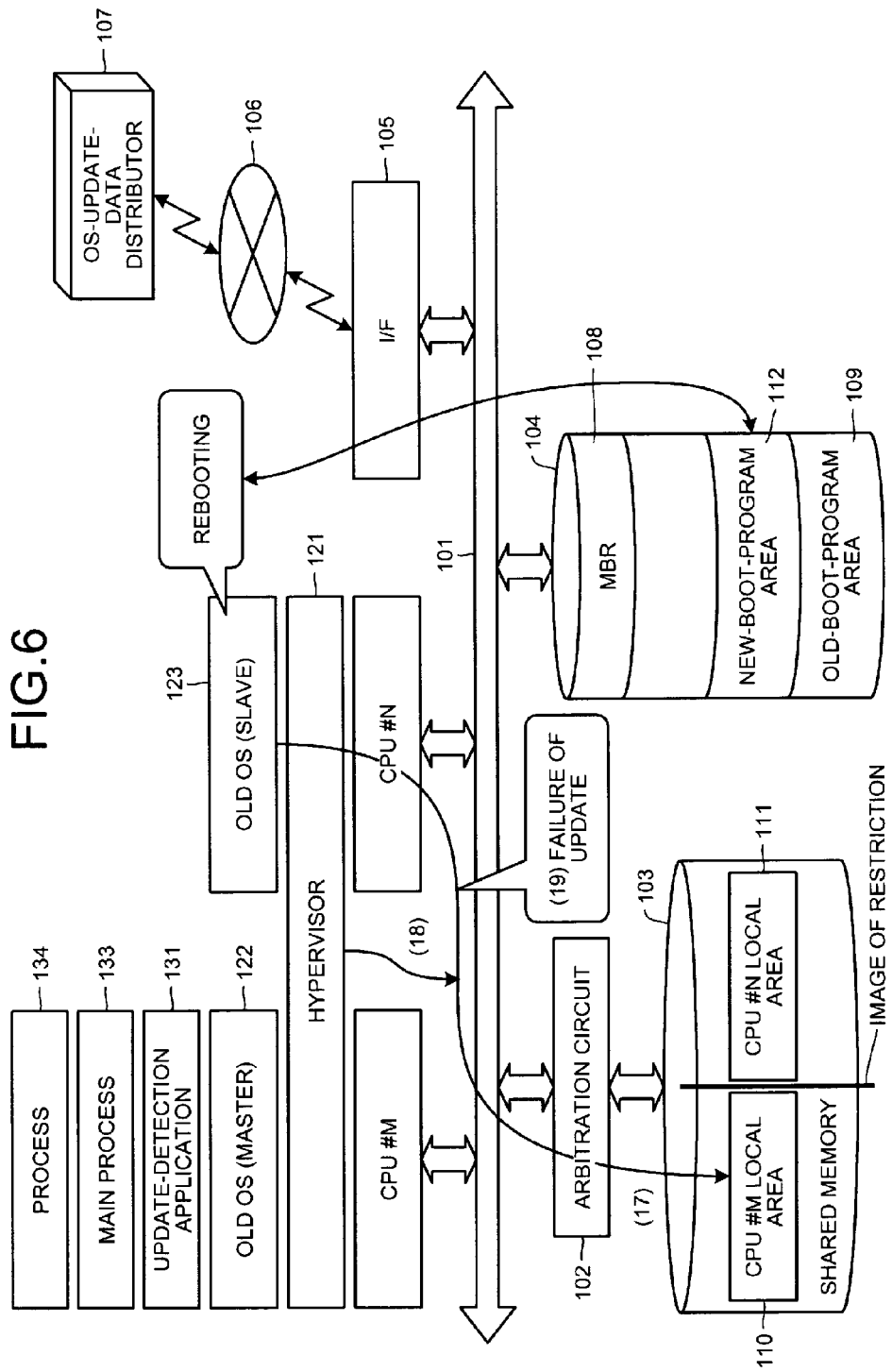
FIG. 6 is a diagram of an example of memory access restriction performed by a hypervisor 121 (part 1)

FIG. 6 is a diagram of an example of the memory access restriction performed by the hypervisor 121 (part 1). In the figure, it is assumed that (17) the rebooting old OS accesses the CPU #M local area 110 in the shared memory 103. After the start of the memory access restriction, the hypervisor 121 detects all accesses of the shared memory 103 by an application(s) and the addresses accessed.

The hypervisor 121 (18) detects access of the CPU #M local area 110 in the shared memory 103 by the rebooting old OS and the address accessed. The hypervisor 121 determines whether the access is by the CPU #N. Here, the access is determined to be by the CPU #N since the access is by the old OS (slave) 123. The hypervisor 121 determines whether the access is an access of a local area of another CPU, based on the address accessed.

Here, the detected access is determined to be an access of the CPU #M local area 110, and (19) the hypervisor 121 outputs (e.g., displays on a display, transmits to an external device(s) by the I/F 105, or stores into an area of the shared memory 103 other than the local areas of the CPUs) a failure of the update of the old OS (slave) 123 or corruption of the downloaded new boot program.

A normal boot program does not cause any access of the CPU #M local area 110, which is an work area of the CPU #M, by the booting CPU #N. Thus, an update to an abnormal boot program can be prevented by the processes (17) to (19).

Figure 7:
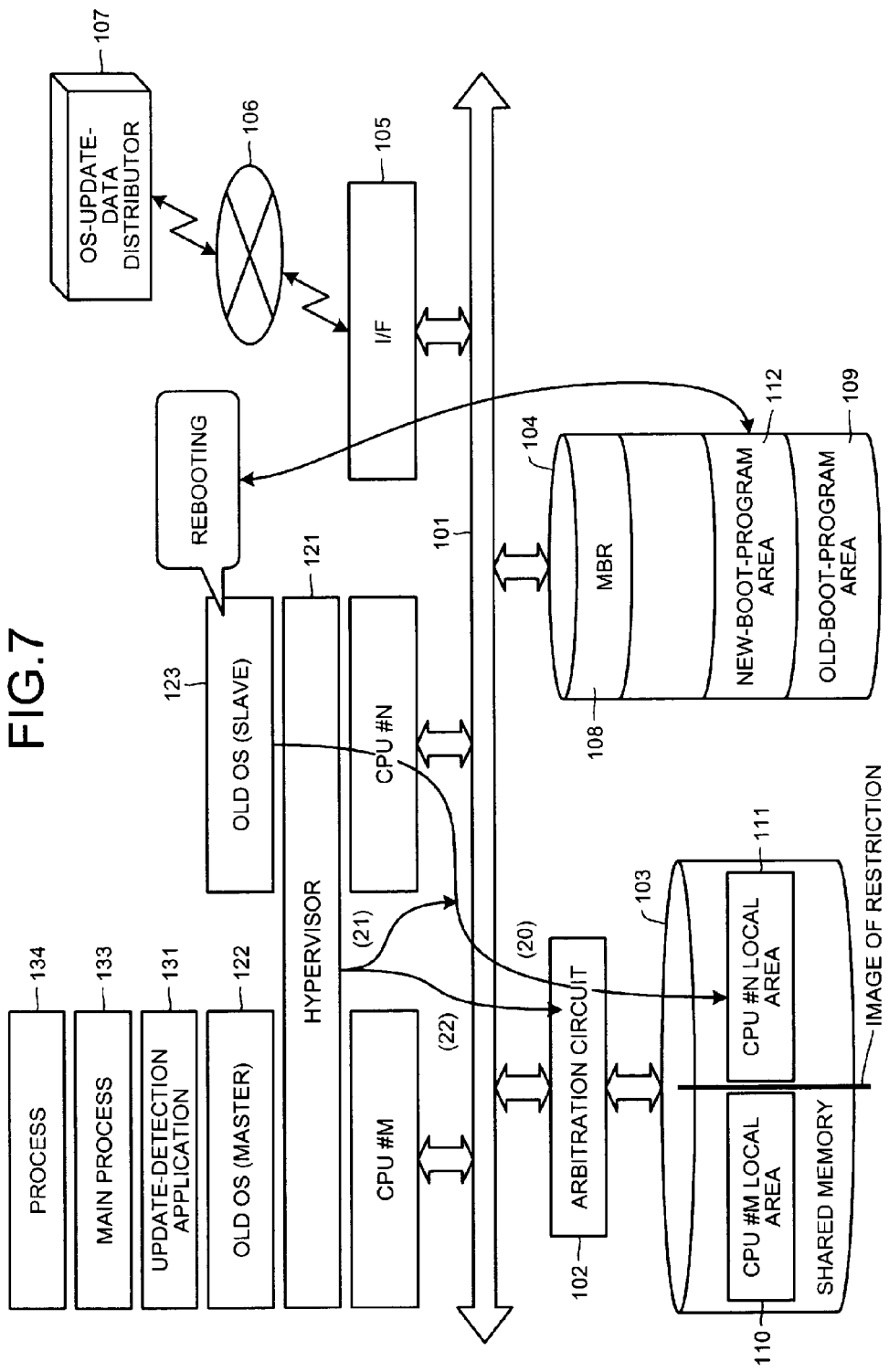
FIG. 7 is a diagram of the example of the memory access restriction performed by the hypervisor 121 (part 2)

FIG. 7 is a diagram of the example of the memory access restriction performed by the hypervisor 121 (part 2). In FIG. 7, it is assumed that (20) the rebooting old OS accesses the CPU #N local area 111 in the shared memory 103.

The hypervisor 121 (21) detects the access of the CPU #N local area 111 in the shared memory 103 by the rebooting old OS. The hypervisor 121 determines whether the access is by the CPU #N. Here, the access is determined to be by the CPU #N since the access is by the old OS (slave) 123. The hypervisor 121 determines whether the access is an access of a local area of another CPU based on the address specified in the detected access.

Here, the detected access is determined to be an access of the CPU #N local area 111, and the hypervisor 121 (22) sets the priority information concerning the CPU #N and stored in the arbitration circuit 102 to "low," and gives notification of the access instruction.

The booting CPU #N initializes various tables, updates system files, temporarily pushes/pops system files, and flushes cache data according to the temporal push/pop. In other words, the booting CPU #N is more likely to access the shared memory 103 compared to the CPU #M executing a general application.

Memory contention (i.e., contention of right to access the memory) can be prevented by setting the priority information concerning the CPU #N and stored in the arbitration circuit 102 to "low" as described above. Further, the OS can be updated without affecting the application executed on the CPU #M that is not a booting CPU.

Figure 8:
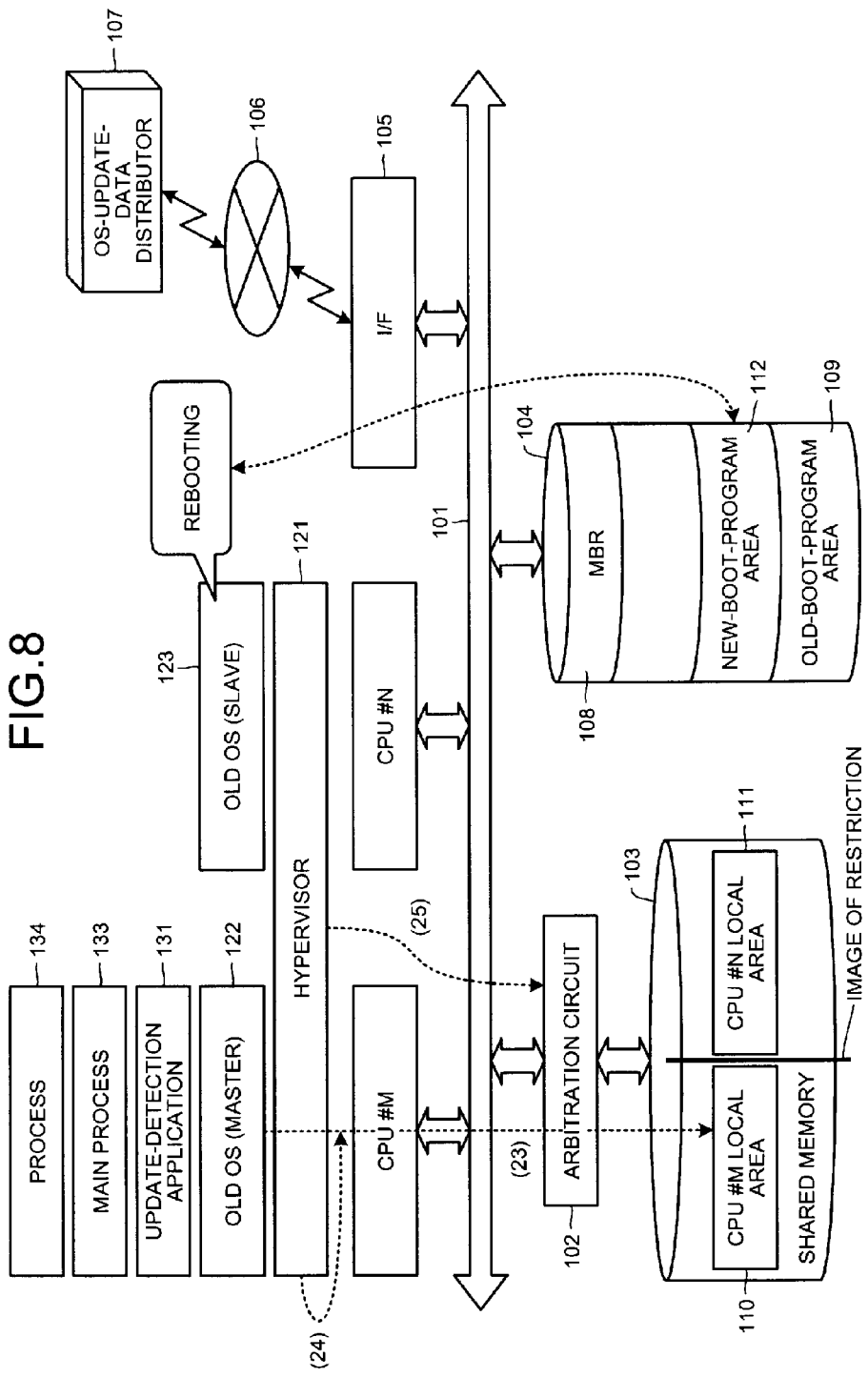
FIG. 8 is a diagram of the example of the memory access restriction performed by the hypervisor 121 (part 3)

FIG. 8 is a diagram of the example of the memory access restriction performed by the hypervisor 121 (part 3). In FIG. 8, it is assumed that (23) the old OS (master) 122 accesses the CPU #M local area 110 in the shared memory 103.

The hypervisor 121 (24) detects access of the CPU #M local area 110 in the shared memory 103 by from the old OS (master) 122. The hypervisor 121 determines whether the detected access is by the CPU #N. Here, the access is determined not to be by the CPU #N since the access is by the old OS (master) 122. The hypervisor 121 determines whether the access is an access of a local area of another CPU based on the address indicated by the detected access.

Here, the detected access is determined to be an access of the CPU #M local area 110, and the hypervisor 121 (25) sets the priority information concerning the CPU #N and stored in the arbitration circuit 102 to "low," and notifies the old OS (master) 122 of the access instruction.

Figure 9:
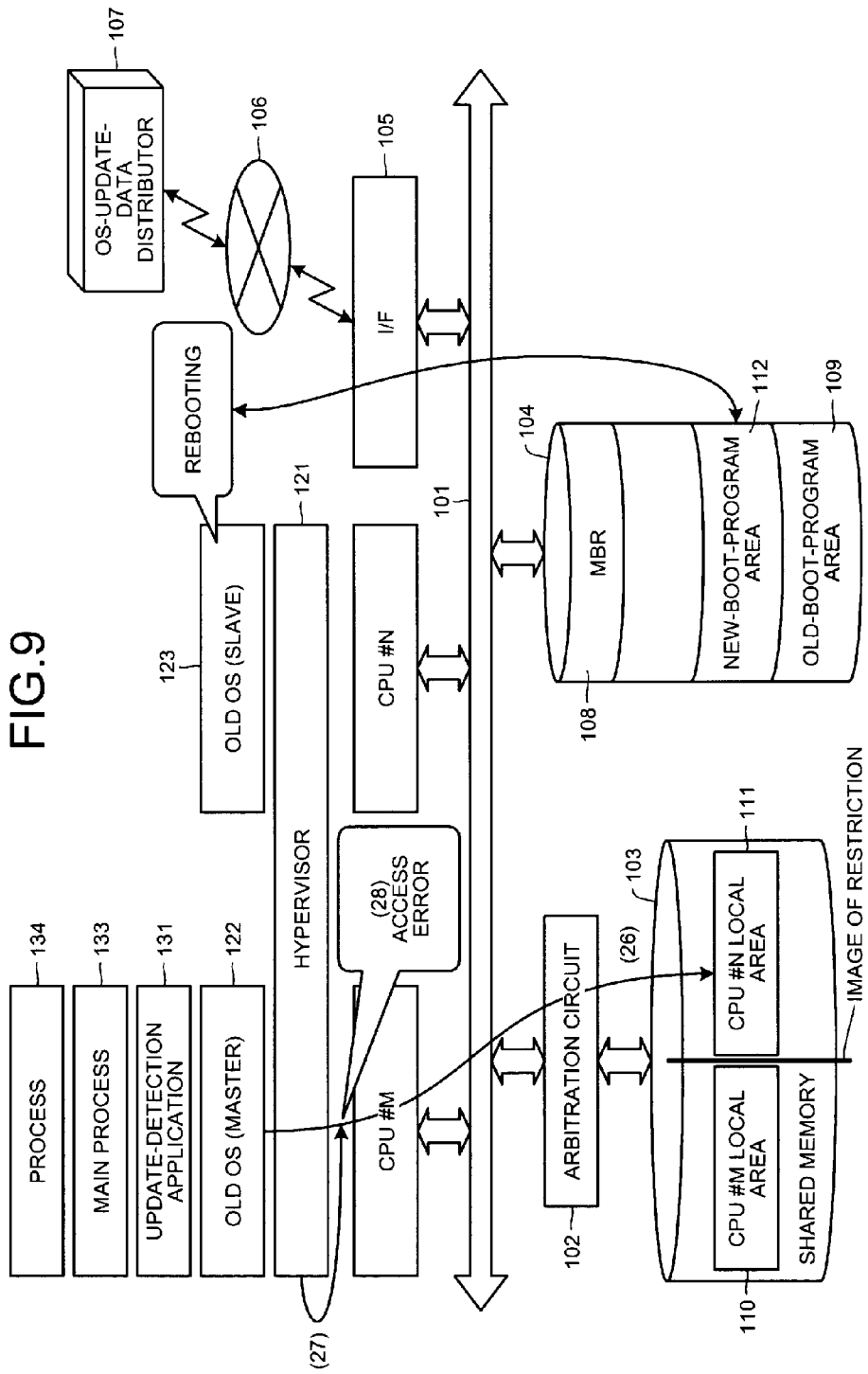
FIG. 9 is a diagram of the example of the memory access restriction performed by the hypervisor 121 (part 4)

FIG. 9 is a diagram of the example of the memory access restriction performed by the hypervisor 121 (part 4). In FIG. 9, it is assumed that (26) the old OS (master) 122 access the CPU #N local area 111 in the shared memory 103.

The hypervisor 121 (27) detects access of the CPU #N local area 111 in the shared memory 103, by the old OS (master) 122. The hypervisor 121 determines whether the detected access is by the CPU #N. Here, the access is determined not to be by the CPU #N since the access is by the old OS (master) 122. The hypervisor 121 determines whether the access is an access of a local area of another CPU in the shared memory 103 based on the address indicated by the detected access.

Here, the detected access is determined to be an access of the CPU #N local area 111, and the hypervisor 121 (28) outputs (e.g., displays on a display, transmits to an external device(s) by the I/F 105, or stores into an area of the shared memory 103 other than the local areas of the CPUs) an access error.

Figure 10:
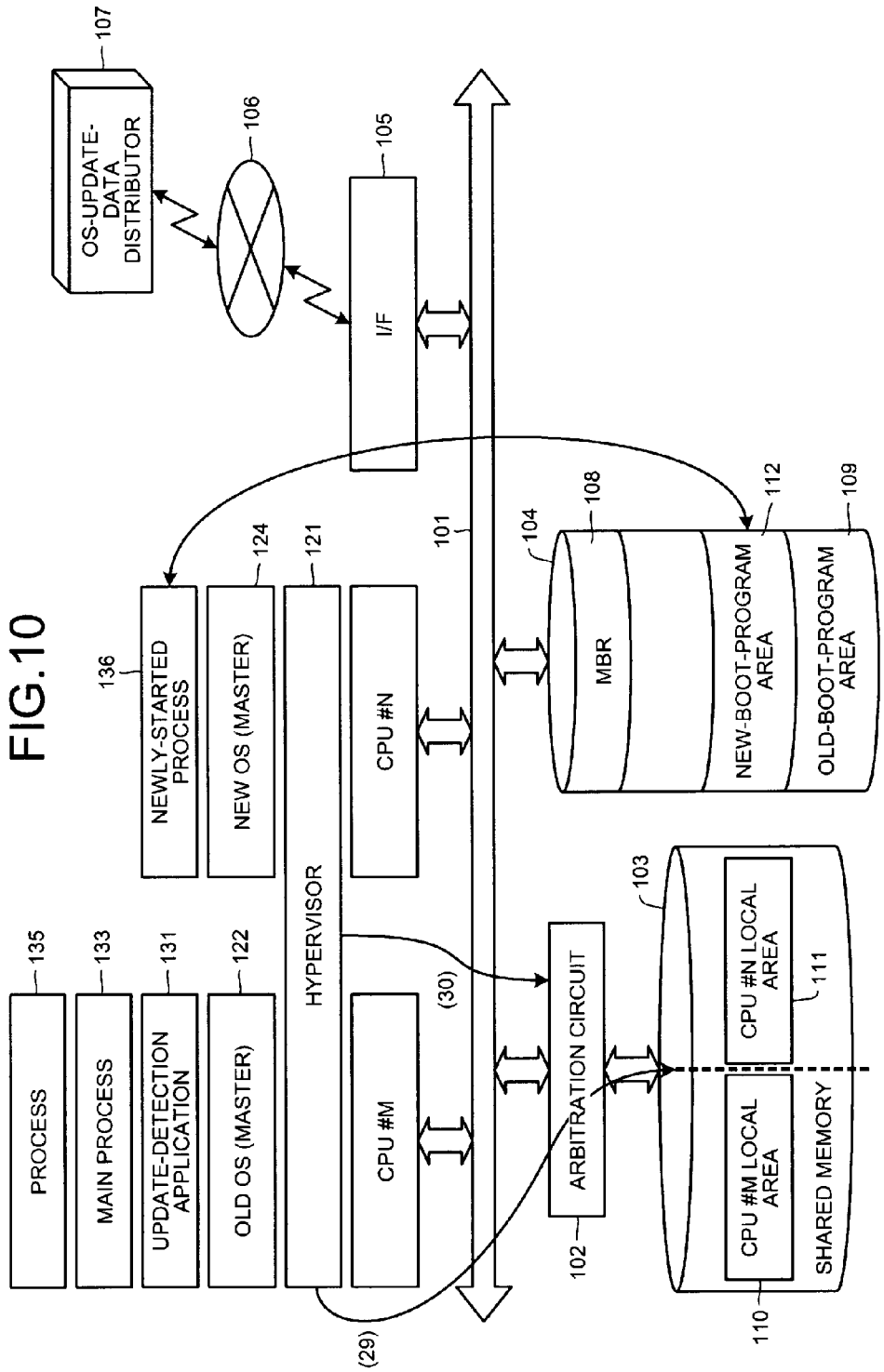
FIG. 10 is a diagram of an example of booting a new OS on the CPU #N.

FIG. 10 is a diagram of an example of booting the new OS on the CPU #N. In FIG. 10, a new OS (master) 124 is booted on the CPU #N as a master OS. Here, master OSs are present for the new OS and the old OS, respectively. However, the co-existing new/old master OSs in the multicore processor system 100 do not conflict with each other since a newly-started process 136 that is newly assigned is scheduled and executed by the new OS (master) 124. A process 135 is a process assigned to the old OS (master) 122 during the boot of the old OS (slave) 123.

When the new OS (master) 124 is booted on the CPU #N, the hypervisor 121 (29) releases the memory access restriction and (30) restores the priority information stored in the arbitration circuit 102. For example, the priority information stored in the arbitration circuit 102 is copied and stored into the shared memory 103 immediately before the start of the memory access restriction, and after the release of the memory access restriction, restored in the arbitration circuit 102 using the copied priority information so as to overwrite the changed priority information.

Figure 11:
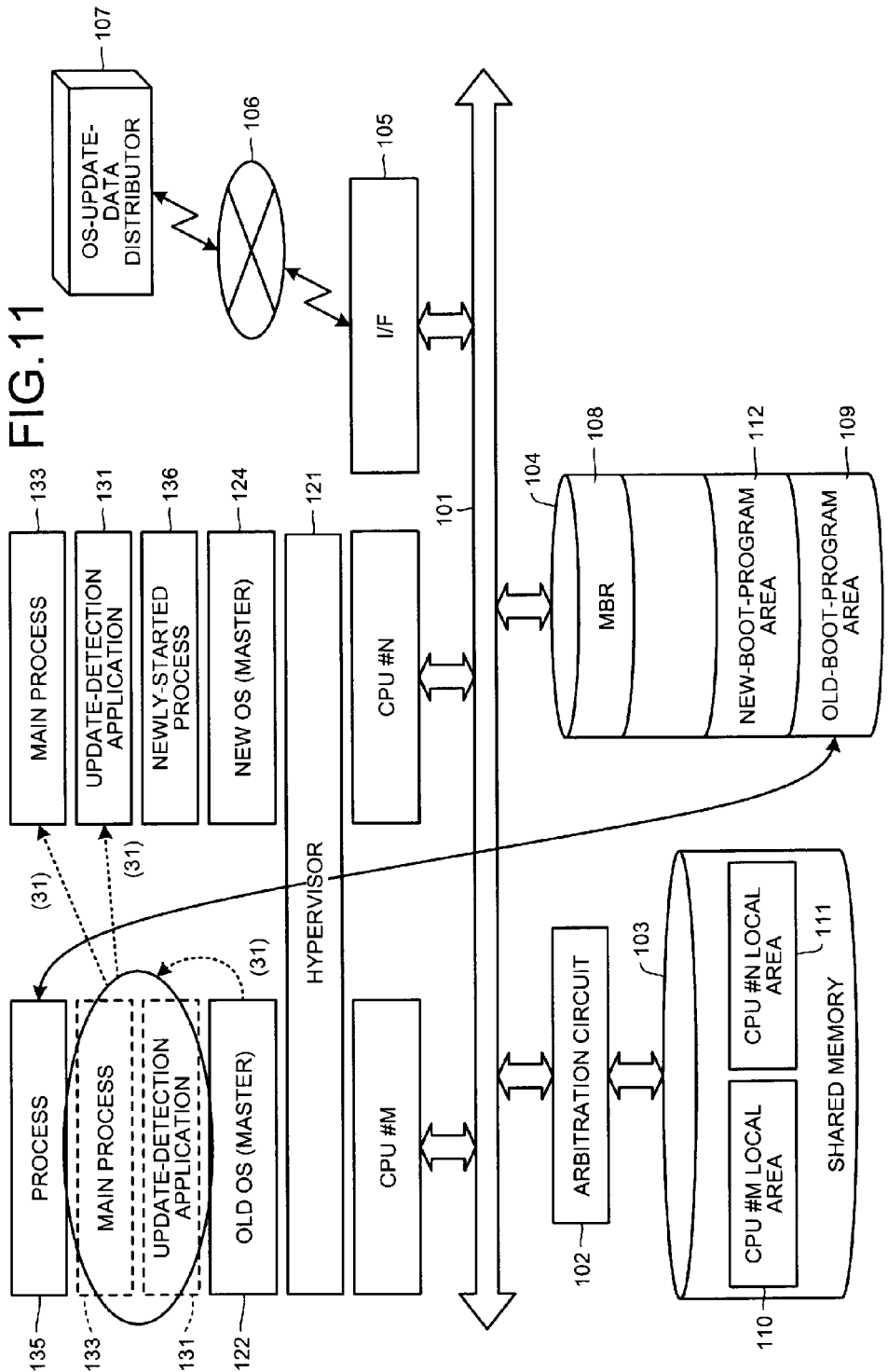
FIG. 11 is a diagram of an example of preparation for booting the new OS on a CPU #M.

FIG. 11 is a diagram of an example of preparation for booting the new OS on the CPU #M. The old OS (master) 122 identifies a process(es) assigned thereto based on a process table. Among the identified process(es), the old OS (master) 122 continues to execute a process(es) that is open or dynamically linked to the old boot program. On the other hand, (31) the old OS (master) 122 migrates other process(es) (here, the main process 133 and the update-detection application 131) to the new OS (master) 124.

Figure 12:
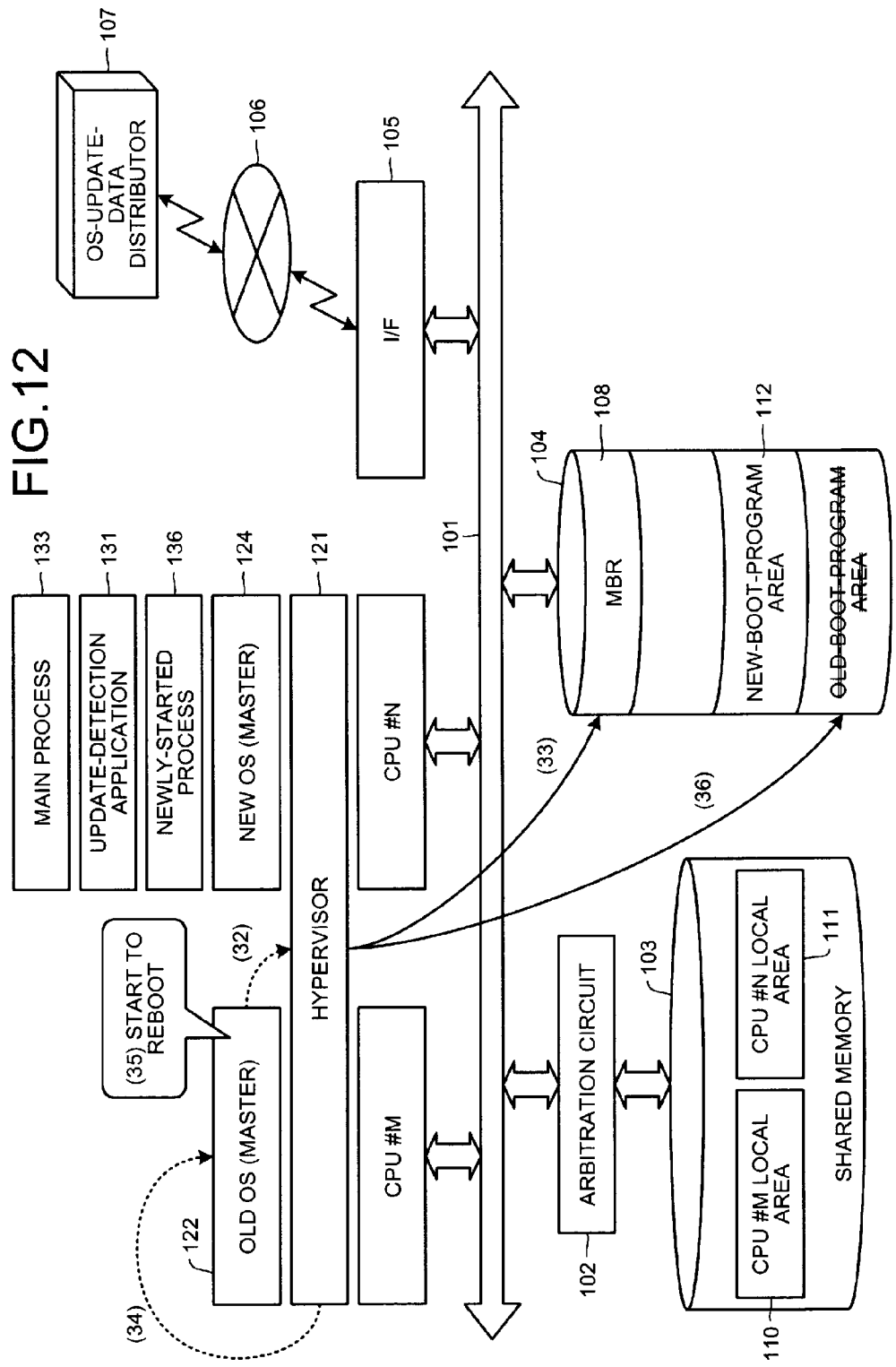
FIG. 12 is a diagram of an example in which all processes assigned to the CPU #M have completed.

FIG. 12 is a diagram of an example in which all processes assigned to the CPU #M have been completed. In FIG. 12, the old OS (master) 122 identifies no process assigned to thereto since the process(es) assigned thereto has been completed. (32) The old OS (master) 122 notifies the hypervisor 121 of the completion of all processes assigned to the old OS (master) 122.

(33) Upon receiving the notification, the hypervisor 121 changes the reference area of the boot program indicated by the partition table 401 stored in the MBR 108 to the new-boot-program area 112, and (34) notifies the old OS (master) 122 of a reboot instruction. Since the reference area of the boot program indicated by the partition table 401 has been changed, (35) upon receiving the reboot instruction, the old OS (master) 122 starts to reboot using the new boot program. Here, the old OS (master) 122 is booted as a new OS (slave) 125. (36) The hypervisor 121 discards the old boot program.

Figure 13:
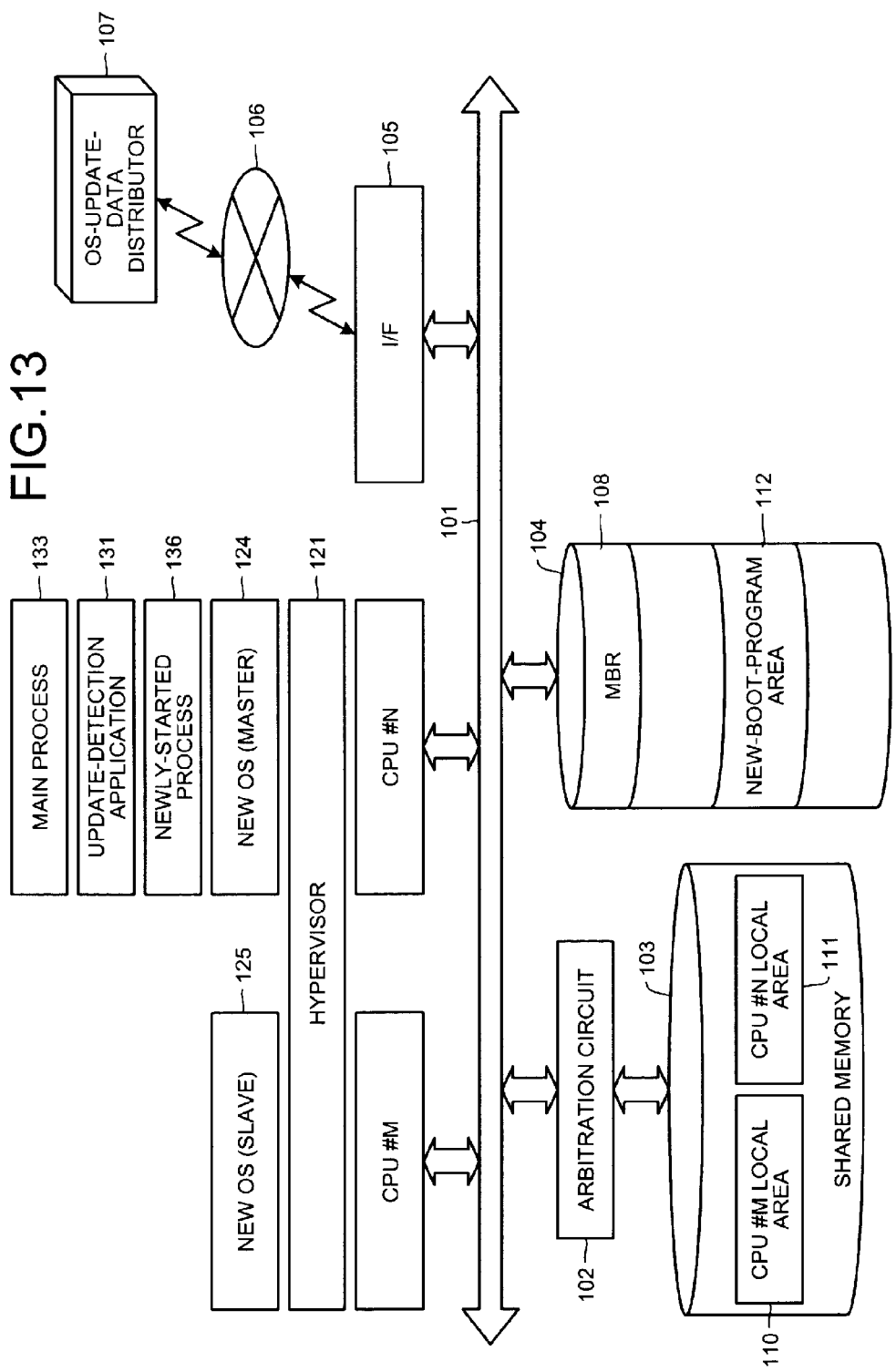
FIG. 13 is a diagram of an example in which the new OS is booted on all CPUs.

FIG. 13 is a diagram of an example in which the new OS is booted on all CPUs. In FIG. 13, the old OS (master) 122 is started up as the new OS (slave) 125. The area for the old boot program in the storage 104 is empty.

Figure 14:
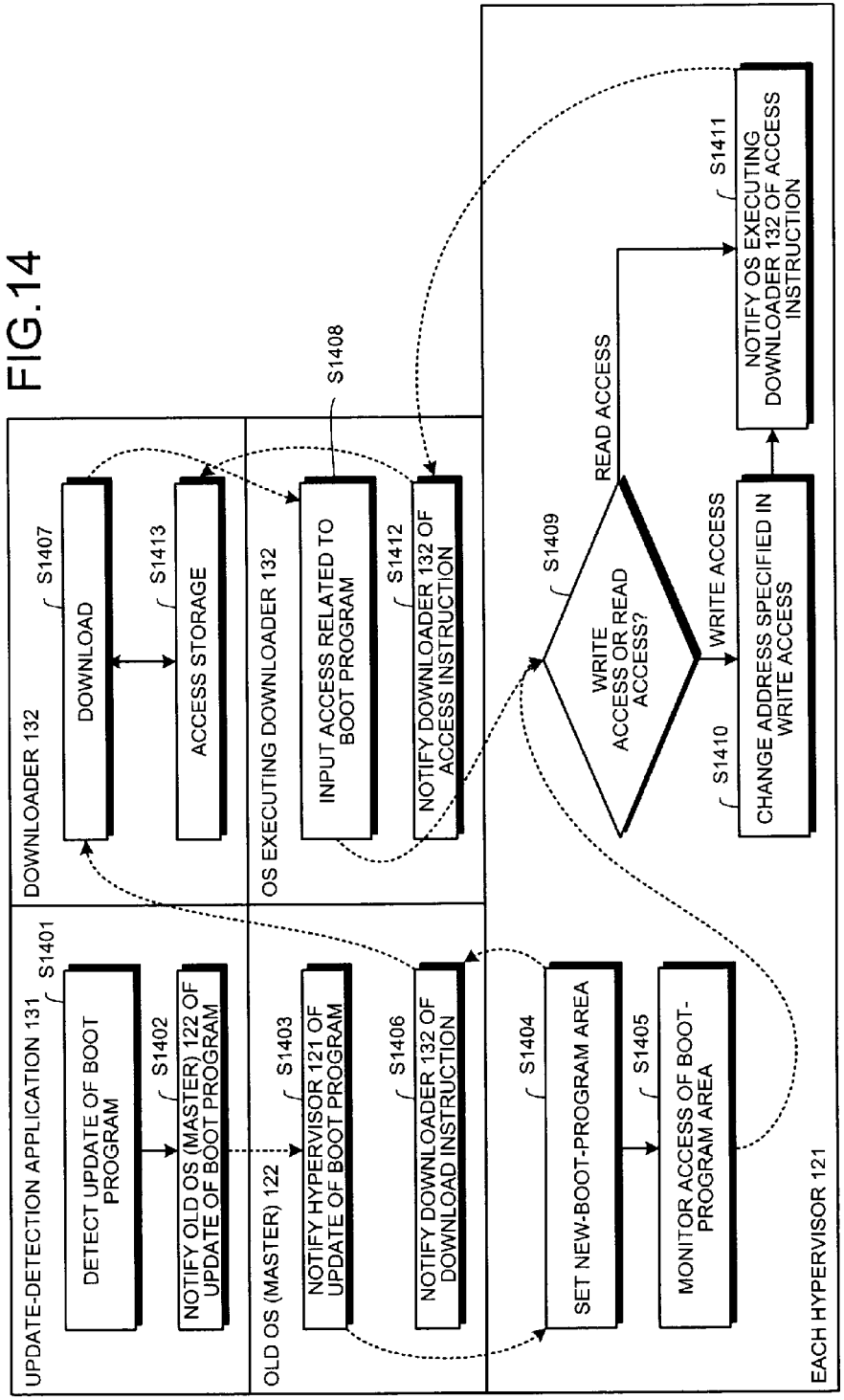
FIG. 14 is a flowchart of an update of an OS performed by the multicore processor system 100 (part 1)

FIG. 14 is a flowchart of an update of the OS performed by the multicore processor system 100 (part 1). Here, processes before and during the download and during the static verification performed by the hypervisor 121, the old OS (master) 122, the downloader 132, and the update-detection application 131 are described. The update-detection application 131 detects an update of the boot program (step S1401), and notifies the old OS (master) 122 of the update of the boot program (step S1402). Upon receiving the update of the boot program, the old OS (master) 122 notifies the hypervisor 121 of the update of the boot program (step S1403).

Upon receiving the update of the boot program, the hypervisor 121 sets the new-boot-program area based on the old boot program and the given mask value, and notifies the old OS (master) 122 of the download instruction (step S1404). The hypervisor 121 monitors access of the boot-program area concerning the boot program (step S1405). The monitoring of access is represented by steps S1409 to S1411.

Upon receiving the download instruction from the hypervisor 121, the old OS (master) 122 notifies the downloader 132 of the download instruction (step S1406). Upon receiving the download instruction, the downloader 132 starts the download and the static verification (step S1407). If the downloader 132 accesses the storage during the download or the static verification, the access is input into the old OS (master) 122. Upon receiving access of the storage, the OS executing the downloader 132 inputs the access into the hypervisor 121 (step S1408).

Upon receiving the input of the access, the hypervisor 121 determines whether the access is a write access or a read access (step S1409). If the hypervisor 121 determines the access to be a write access (step S1409: WRITE ACCESS), the hypervisor 121 changes the address specified in the write access based on the given mask value (step S1410), and notifies the OS executing the downloader 132 of the instruction to access the address after the change (step S1411).

On the other hand, if the hypervisor 121 determines the access to be a read access (step S1409: READ ACCESS), the hypervisor 121 gives notification of the instruction to access the address specified in the read access (step S1411). Upon receiving the access instruction after step S1411, the OS executing the downloader 132 notifies the downloader 132 of the access instruction (step S1412). Upon receiving the access instruction, the downloader 132 accesses the storage (step S1413). The arrow between steps S1407 and S1413 indicates the download or the static verification is continued according to the result of the access.

Figure 15:
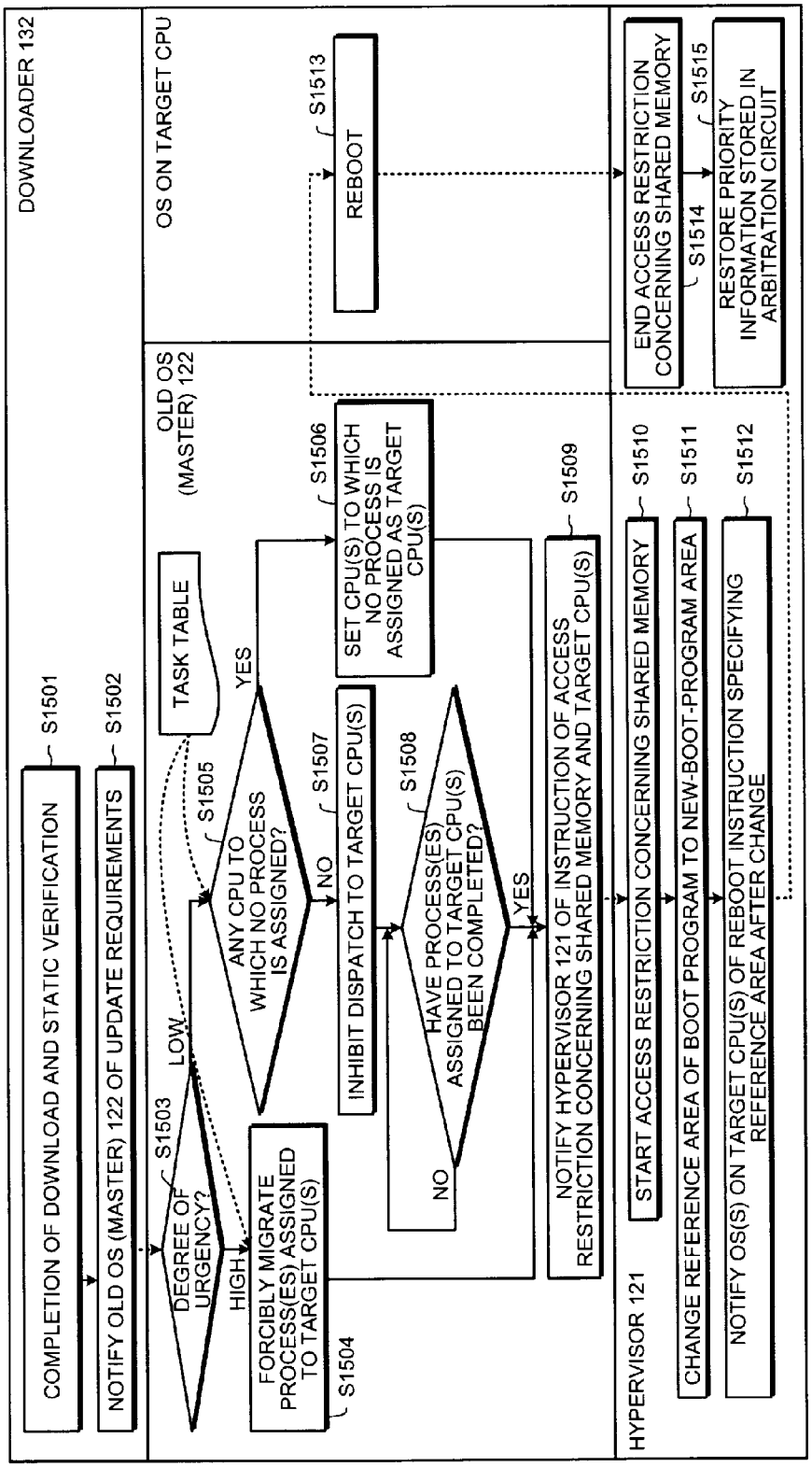
FIG. 15 is a flowchart of the update of the OS performed by the multicore processor system 100 (part 2)

FIG. 15 is a flowchart of the update of the OS performed by the multicore processor system 100 (part 2). Here, processes after the download and the static verification and before the completion of the reboot of the target CPU(s) performed by the hypervisor 121, the old OS (master) 122, and the downloader 132 are described. It is assumed that the old OS (master) 122 is not included in the target CPU(s). Upon completion of the download and the static verification (step S1501), the downloader 132 notifies the old OS (master) 122 of the update requirements (step S1502).

Upon receiving the update requirements, the old OS (master) 122 reads the degree of urgency from the update requirements and determines the degree of urgency (step S1503). If the degree of urgency is high (step S1503: HIGH), the old OS (master) 122 forcibly migrates the process(es) assigned to the target CPU(s) (step S1504), and the process transitions to step S1507.

If the degree of urgency is low (step S1503: LOW), the old OS (master) 122 determines whether there is any CPU to which no process is assigned (step S1505). If the old OS (master) 122 determines there is a CPU(s) to which no process is assigned (step S1505: YES), the old OS (master) 122 sets the CPU(s) to which no process is assigned as the target CPU(s) (step S1506), and the process transitions to step S1509. Here, the target CPU(s) includes only a CPU(s) to which no process is assigned.

If the old OS (master) 122 determines there is no CPU to which no process is assigned (step S1505: NO), the old OS (master) 122 inhibits dispatch to the target CPU(s) (step S1507). The old OS (master) 122 determines whether the process(es) assigned to the target CPU(s) have been completed (step S1508). If the old OS (master) 122 determines the process(es) assigned to the target CPU(s) has not yet completed (step S1508: NO), the process transitions to step S1508.

On the other hand, if the old OS (master) 122 determines the process(es) assigned to the target CPU(s) have completed (step S1508: YES), the old OS (master) 122 notifies the hypervisor 121 of the instruction of access restriction concerning the shared memory and the target CPU(s) (step S1509).

Upon receiving the instruction of access restriction concerning the shared memory and the target CPU(s), the hypervisor 121 starts the access restriction (step S1510) of which flowchart is described later. The hypervisor 121 changes the reference area of the boot program to the new-boot-program area (step S1511).

The hypervisor 121 notifies the OS(s) on the target CPU(s) of the reboot instruction specifying the reference area after the change (step S1512). The OS on the target CPU is an OS that causes the target CPU to execute a process. Here, one of the target CPU(s) is instructed to become the master OS when started up by the new boot program. Upon receiving the reboot instruction, the OS(s) on the target CPU(s) reboots and notifies the hypervisor 121 of the completion of the reboot (step S1513). Upon receiving the completion of the reboot from all target CPU(s), the access restriction concerning the shared memory is ended (step S1514), and the priority information stored in the arbitration circuit is restored (step S1515), which means to change the priority information back to that before the start of the access restriction since the priority information stored in the arbitration circuit is changed due to the access restriction.

FIG. 16 is a flowchart of the memory access restriction performed by the hypervisor 121. The hypervisor 121 starts the memory access restriction, and detects an access of the shared memory by an application (step S1601). The hypervisor 121 determines whether the access is by the target CPU (step S1602). Here, the target CPU is rebooting. If the hypervisor 121 determines the access to be by the target CPU (step S1602: YES), the hypervisor 121 determines whether the access is an access of a local area of another CPU (step S1603).

If the hypervisor 121 determines the access to be an access of the local area of another CPU (step S1603: YES), the hypervisor 121 outputs a failure of the update (step S1604) and recovers (step S1605). On the other hand, if the hypervisor 121 determines the access not to be by the target CPU (step S1602: NO), the hypervisor 121 determines whether the access is an access of a local area of another CPU (step S1606). If the hypervisor 121 determines the access to be an access of the local area of another CPU (step S1606: YES), the hypervisor 121 outputs an access error (step S1607).

On the other hand, if the hypervisor 121 determines the access not to be an access of the local area of another CPU (step S1603: NO or step S1606: NO), the hypervisor 121 sets the priority information concerning the target CPU and stored in the arbitration circuit to "low" (step S1608), and notifies the accessor of the access instruction (step S1609). The hypervisor 121 repeats the processes until an end instruction of the memory access restriction is received.

FIG. 17 is a flowchart of the update of the OS performed by the multicore processor system 100 (part 3). When the new OS is started up, the new OS (master) 124 controls a new process to be assigned to the new OS (step S1701). The old OS (master) 122 identifies a process(es) already executing on the old OS based on the task table (step S1702).

The old OS (master) 122 determines whether there is any process already executing on the old OS (step S1703). If the old OS (master) 122 determines there is a process(es) already executing on the old OS (step S1703: YES), the old OS (master) 122 determines whether there is any unselected process(es) already executing (step S1704). If not (step S1704: NO), the process returns to step S1702. If so (step S1704: YES), the old OS (master) 122 selects an arbitrary process from among the unselected process(es) already executing (step S1705).

The old OS (master) 122 determines if the selected process is open or dynamically linked to a system file (step S1706). If the selected process is open or dynamically linked to a system file (step S1706: YES), the process returns to step S1704. If not (step S1706: NO), the old OS (master) 122 migrates the selected process to the new OS (step S1707), and the process returns to step S1704.

On the other hand, if the old OS (master) 122 determines there is no process already executing on the old OS (step S1703: NO), the old OS (master) 122 notifies the hypervisor 121 that there is no process already executing (step S1708). The hypervisor 121 changes the reference area in the partition table to the new-boot-program area (step S1709), and notifies the old OS of the reboot instruction specifying the reference area after the change (step S1710).

Upon receiving the reboot instruction, the old OS including the old OS (master) 122 reboots with the new boot program (step S1712). Subsequent to step S1710, the hypervisor 121 discards the old boot program (step S1711).

As described above, the multicore processor system, the notification program, and the notification method notify a reboot instruction to reboot cores that have been booted by the old boot program by the new boot program, such that a core(s) to which no process is assigned is rebooted prior to the other cores. The core(s) that receives the reboot instruction reboots with the new boot program. Thus, an idle core(s) is immediately rebooted prior to other cores, thereby preventing the suspension of the process and enabling the OS to be updated without any suspension.

If a core(s) to which no process is assigned is not present, the reboot instruction to reboot the cores with the new boot program is notified to a core(s) that has completed a process(es) assigned thereto, thereby enabling the OS to be updated without any suspension of the executing process.

Further, the new-boot-program area into which the new boot program is downloaded is set after the receiving the update of the new boot program, thereby achieving efficient use of the storage.

Further, the addresses of the old-boot-program area stored in the partition table in the MBR are changed to the addresses of the new-boot-program area after the reboot instruction, thereby enabling the CPU that has rebooted with the new boot program to reboot with the new boot program, even when the CPU is turned on again.

The multicore processor system, the notification program, and the notification method can update an OS without any suspension and with a reduced scale and/or cost.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multicore processor system comprising a processor configured to:
    detect, among cores that have booted with an old boot program in the multicore processor, a core to which no process is assigned,
    change upon detecting the core to which no process is assigned, a reference area from a storage area for the old boot program to a storage area for a new boot program,
    notify the core to which no process is assigned of a reboot instruction specifying the reference area after the change,
    set upon receiving an instruction to update the new boot program, the storage area for the new boot program based on the storage area for the old boot program and a given mask value,
    receive, after setting the storage area for the new boot program, an input of an access of the storage area for the old boot program, related to a download of the new boot program, and
    determine whether the received access is a write access or a read access, and upon determining the access to be the write access, changes an address specified in the write access to an address specifying the storage area for the new boot program based on the given mask value and notifies an accessor of the write access of an instruction to access the address after the change, and upon determining the access to be the read access, notifies an accessor of the read access of an instruction to access an address specified in the read access.

2. The multicore processor system according to claim 1, wherein
    the processor upon not detecting a core to which no process is assigned, detects a core that has completed all processes assigned to the core, and upon detecting a core that has completed the processes, changes the reference area from the storage area for the old boot program to the storage area for the new boot program.

3. A multicore processor system comprising a plurality of cores, a storage unit storing a first boot program executed by the plurality of cores and a boot address that is accessed by the plurality of cores when the plurality of cores boot up, and a shared memory shared by the plurality of cores, wherein a first core of the plurality of cores is configured to:
    write a second boot program to a storage area different from a storage area for the first boot program in the storage unit;
    change a reference area that is referred when a second core reboots, by the second core to which no process is assigned, among the plurality of cores booted by the first boot program, from the storage area for the first boot program to a storage area for a second boot program;
    notify to the second core of a reboot instruction specifying the reference area after the change; and
    set, when an access request is requested for the storage area assigned to the second core in the shared memory while the second core notified of the reboot instruction is booting up, a priority information concerning the second core to LOW, the priority information indicating priority of each core for accessing the shared memory.

4. The multicore processor system according to claim 3, wherein
    the first core upon giving notification of the reboot instruction, changes the address specifying the storage area for the first boot program and stored in a master boot record of a storage device to the address specifying the storage area for the second boot program based on the given mask value.

5. The multicore processor system according to claim 3, wherein the first core is configured to:
    set upon receiving an instruction to update the second boot program, the storage area for the second boot program based on the storage area for the first boot program and a given mask value,
    receive, after setting the storage area for the second boot program, an input of an access of the storage area for the first boot program, related to a download of the second boot program, and
    determine whether the received access is a write access or a read access, and upon determining the access to be the write access, changes an address specified in the write access to an address specifying the storage area for the second boot program based on the given mask value and notifies an accessor of the write access of an instruction to access the address after the change, and upon determining the access to be the read access, notifies an accessor of the read access of an instruction to access an address specified in the read access.

6. A method for controlling a multicore processor system comprising a plurality of cores, a storage unit storing a first boot program executed by the plurality of cores and a boot address that is accessed by the plurality of cores when the plurality of cores boot up, and a shared memory shared by the plurality of cores, wherein the method comprising:
    writing, by a first processor, a second boot program to a storage area different from a storage area for the first boot program in the storage unit;
    changing, by the first processor, a reference area that is referred when a second core reboots, by the second core to which no process is assigned, among the plurality of cores booted by the first boot program, from the storage area for the first boot program to a storage area for a second boot program;
    notifying, by the first processor, to the second core of a reboot instruction specifying the reference area after the change; and
    setting, by the first processor, when an access request is requested for the storage area assigned to the second core in the shared memory while the second core notified of the reboot instruction is booting up, a priority information concerning the second core to LOW, the priority information indicating priority of each core for accessing the shared memory.

* * * * *